S. F. BUTTS.
Oatmeal-Machine.

No. 217,844.    Patented July 22, 1879

Witnesses
George F. Robinson
Luther Day

Inventor
Samuel F. Butts.
by Bradford Howland
his attorney.

UNITED STATES PATENT OFFICE.

SAMUEL F. BUTTS, OF RAVENNA, OHIO, ASSIGNOR TO THE QUAKER MILL COMPANY, OF SAME PLACE.

IMPROVEMENT IN OATMEAL-MACHINES.

Specification forming part of Letters Patent No. 217,844, dated July 22, 1879; application filed March 3, 1879.

*To all whom it may concern:*

Be it known that I, SAMUEL F. BUTTS, of Ravenna, Portage county, Ohio, have invented new and useful Improvements in Oatmeal-Machines, of which the following is a specification.

My invention relates to that class of oatmeal-machines in which the oats are cut into a coarse meal.

The object of my invention is to cut the oats which lie in longitudinal grooves on the circumference of a rotating cylinder by a more rapidly-rotating cylinder having radial cutting-edges, which enter annular grooves in the first-mentioned cylinder.

Figure 1:
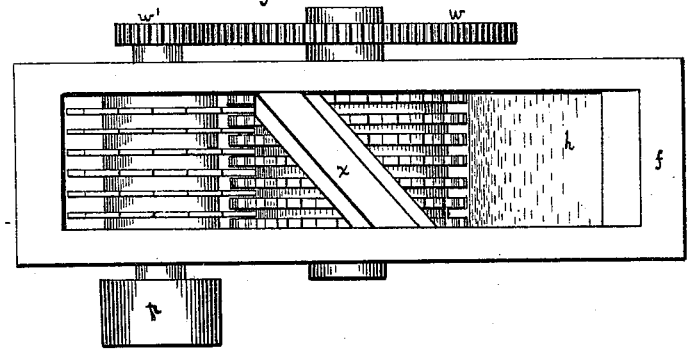
Figure 2:
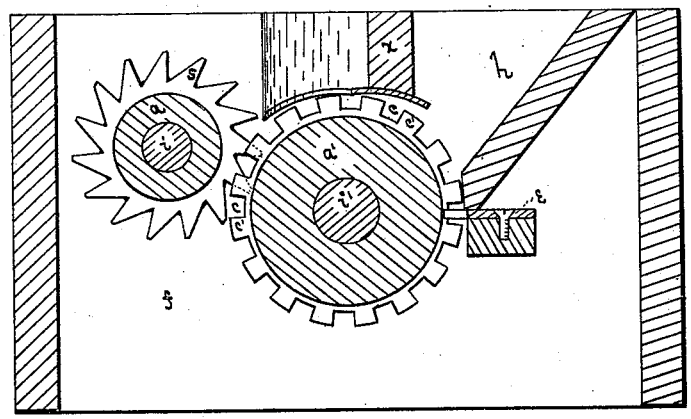

Figure 1 is a plan. Fig. 2 is a vertical section.

The shafts $i$ $i'$ of cylinders $a$ $a'$ turn in the frame, the power being applied to pulley $p$. The two shafts $i$ $i'$ are connected by gear-wheels $w$ $w'$. Cylinder $a$ rotates to the left, and cylinder $a'$, to the right. Cylinder $a'$ has its circumference grooved longitudinally, and also annularly. The longitudinal grooves $c$ are to hold the oats lying lengthwise in them. The annular grooves $c'$ are slightly deeper than grooves $c$, and are sufficiently narrow to prevent the oats from entering them.

The teeth or knives $s$, arranged annularly on cylinder $a$, enter grooves $c'$. Cylinder $a$ rotates much more rapidly than cylinder $a'$, causing knives $s$, which project into grooves $c'$, below the bottom of grooves $c$, to cut the oats. The shaft of cylinder $a$ is higher than the shaft of cylinder $a'$, causing the knives $s$ to cut the oats before the rotation of cylinder $a'$ has carried the oats down far enough for them to fall out of grooves $c$. The lower or cutting edges of knives $s$ are at such an angle to the radius of cylinder $a$ that when the knives are cutting their edges will be in line, or nearly so, with the radius of cylinder $a'$.

The oats are fed on cylinder $a'$ by the hopper $h$. Between the hopper and knives $s$ the guard $x$, attached to frame $f$, extends diagonally the whole length of cylinder $a'$, close to its circumference. The function of guard $x$ is to force oats lengthwise into grooves $c$, and prevent any which are not in that position from passing the guard to the knives. For this purpose the guard $x$ is set diagonally across grooves $c$, in which position it does not sever kernels standing upright, but acts as a cam to force the upper ends of the kernels lengthwise of and into grooves $c$.

The toothed guard $e$, attached to frame $f$, extends the whole length of cylinder $a'$, and its teeth enter grooves $c'$ to clear them of meal. In the place of rotating cylinder $a$ and its knives $s$, stationary knives may be used, with their cutting-edges at right angles, or nearly so, with the radius of cylinder $a'$.

I claim as my invention—

The rotating feeding-cylinder $a'$, provided with circumferential grooves $c'$ and longitudinal grooves $c$, and the stationary cam-guard $x$, arranged diagonally across the feeding-grooves $c$, in combination with the rotating cylinder $a$, provided with knives $s$, arranged annularly on the cylinder, substantially as and for the purpose described.

SAMUEL F. BUTTS.

Witnesses:
BRADFORD HOWLAND,
H. D. SEYMOUR.